Patented Apr. 8, 1930

1,753,626

UNITED STATES PATENT OFFICE

JULIUS SCHLINCK AND GEORG MÜNCHMEYER, OF HAMBURG, GERMANY

PROCESS FOR THE MANUFACTURE OF HORN-LIKE MATERIAL

No Drawing. Application filed February 17, 1926, Serial No. 88,962, and in Germany February 21, 1925.

Albuminous substances such as casein, blood substances and proteins are converted as is generally known into horn-like products by subjecting the moistened kneaded and moulded mass to the action of aqueous formaldehyde solutions. This process which is known in the industry as the hardening process has however the disadvantage that even in the case of moulded articles of small thickness, such as 2 centimetres for example, a reaction time of some months is necessary. It has therefore been suggested, as is known from literature on the subject, that the hardening of the pulverulent albuminous substances should be effected with formaldehyde before the kneading or moulding takes place, or that during the kneading, hardening media, such for example as formaldehyde, tannin and the like should be added. These suggestions have not resulted in any practical success. Albuminous substances hardened in advance are no longer sufficiently plastic to enable suitable horn-like products to be made therefrom, while the hardening media suggested as an addition to the mass, such as formaldehyde and paraformaldehyde either act too quickly upon the albuminous substances during the kneading process and thereby hinder the kneading, or else like hexamethylene tetramine, do not harden the product sufficiently.

The present invention starts from the idea of adding to the albuminous substances, and more particularly to casein, before or during the kneading, a hardening medium, which only develops its main action after the kneading and moulding actions have terminated and thus does not hinder these processes. It has been discovered that from paraformaldehyde which in itself acts upon albuminous substances very similarly to formaldehyde, by treating it with acids, such for example as sulphuric acid or formic acid a hardening medium of the kind desired can be obtained. The paraformaldehyde, by the treatment with acid, is in a sense protected from premature decomposition and the giving up of formaldehyde to the albuminous substances, so that it only exerts its hardening action when the kneading and moulding of the albuminous substances have terminated. Its action is promoted and completed by the usual drying of the moulded plastic material.

This process constitutes an important technical advance because it very greatly shortens the time required for the manufacture of horn-like products from albuminous substances. The material obtained admits of being worked in the same manner as the artificial horn-like products already in use.

Examples:

(1) 200 grams of paraformaldehyde are dissolved in 300 grams of sulphuric acid of 35 to 40 per cent by weight by heating to 95° C. and separated out again by cooling. The product separated out is washed free of acid with water that is as cold as possible and is mixed in an aqueous emulsion which is as finely divided as possible with 10 kilograms of slightly moistened casein. The material is then worked in the manner usual in the artificial horn industry, with rollers for example, and pressed under high pressure. The product so obtained is dried.

(2) 10 kilograms of moistened casein are mixed with 150 grams of finely ground paraformaldehyde which has been soaked in 400 grams of a 30 per cent formic acid solution, kneaded by rolling and pressed. The product is then dried.

Having now particularly described and ascertained the nature of our said invention and in what manner the same is to be performed, we declare that what we claim is:—

1. The process of preparing horn-like materials from casein which comprises treating the casein mixed with a hardening medium comprising the product of the treatment of paraformaldehyde with an acid selected from the group consisting of sulphuric acid and formic acid for the purpose of hardening said materials.

2. The process of preparing horn-like materials from casein which comprises treating the casein mixed with a hardening medium comprising the product of the treatment of paraformaldehyde with sulphuric acid to harden the same.

In testimony whereof we affix our signatures.

DR JULIUS SCHLINCK.
GEORG MÜNCHMEYER.